US007596953B2

(12) United States Patent
Krok et al.

(10) Patent No.: US 7,596,953 B2
(45) Date of Patent: Oct. 6, 2009

(54) METHOD FOR DETECTING COMPRESSOR STALL PRECURSORS

(75) Inventors: Michael Joseph Krok, Clifton Park, NY (US); Narayanan Venkateswaran, Bangalore (IN); Mallikarjun Shivaraya Kande, Bangalore (IN)

(73) Assignee: General Electric Company, Niskayuna, NY (US)

( * ) Notice: Subject to any disclaimer, the term of this patent is extended or adjusted under 35 U.S.C. 154(b) by 371 days.

(21) Appl. No.: 10/744,617

(22) Filed: Dec. 23, 2003

(65) Prior Publication Data

US 2005/0132712 A1 Jun. 23, 2005

(51) Int. Cl.
*F02C 7/00* (2006.01)

(52) U.S. Cl. .......................... 60/772; 60/803; 415/118

(58) Field of Classification Search .................. 60/772, 60/778, 794, 795, 803; 415/26, 27, 118
See application file for complete search history.

(56) References Cited

U.S. PATENT DOCUMENTS 6,010,303 A * 1/2000 Feulner ...................... 415/118
6,059,522 A 5/2000 Gertz et al.
6,231,306 B1 * 5/2001 Khalid ...................... 415/118
6,506,010 B1 1/2003 Yeung et al.
6,536,284 B2 3/2003 Bonanni
6,643,799 B1 11/2003 Bonissone et al.
7,143,016 B1 * 11/2006 Discenzo et al. ............... 703/3
2002/0161550 A1 10/2002 Bharadwaj et al.
2002/0184951 A1 12/2002 Bonanni
2004/0024568 A1 * 2/2004 Eryurek et al. .............. 702/182

OTHER PUBLICATIONS

Dremin et al. "Precursors of Stall and Surge Processes Revealed by Walet Analysis"; Control Engineering Practice, Nov. 2002.*

* cited by examiner

*Primary Examiner*—Louis J Casaregola
(74) *Attorney, Agent, or Firm*—Patrick K. Patnode

(57) ABSTRACT

A method of detecting onset of a gas turbine condition, such as compressor stall, includes receiving data indicative of an operating parameter of a compressor of the gas turbine. The method also includes performing a wavelet transformation on the data to generate wavelet transformed data. The wavelet transformation is configured to affect a processing characteristic regarding a performance of the wavelet transformation. Features indicative of onset of the gas turbine condition in the wavelet transformed data are then identified to provide an indication for controlling the gas turbine to prevent compressor stall from occurring. A system for detecting onset of compressor stall in a gas turbine includes a sensor for providing data indicative of an operating parameter of the compressor and a processor for performing a wavelet transform on the data to identify features of the optimized wavelet transformed data indicative of onset of stall.

11 Claims, 3 Drawing Sheets

METHOD FOR DETECTING COMPRESSOR STALL PRECURSORS

FIELD OF THE INVENTION

The present invention is generally related to control of gas turbines, and, more particularly, to a method of detecting rotating stall precursors in a signal using optimized wavelet transformations.

BACKGROUND OF THE INVENTION

It is known that an operating efficiency of a gas turbine may be improved by operating a compressor of the turbine at a relatively high pressure ratio. However, if the pressure ratio is allowed to exceed a certain critical value during turbine operation, an undesirable condition known as compressor stall may occur. Compressor stall may reduce the compressor pressure ratio and reduce the airflow delivered to a combustor, thereby adversely affecting the efficiency of the gas turbine. Rotating stall in an axial-type compressor typically occurs at a desired peak performance operating point of the compressor. Following rotating stall, the compressor may transition into a surge condition or a deep stall condition that may result in a loss of efficiency and, if allowed to be prolonged, may lead to catastrophic failure of the gas turbine.

Typically, gas turbines are controlled to provide a desired surge performance margin above a desired peak performance based on a maximum achievable pressure rise across the compressor. One way of controlling a gas turbine to prevent compressor stall is to measure compressor operating parameters such as air flow and pressure rise through the compressor to detect stall “precursors” indicative of a potential stall condition. Signal processing techniques, such as Kalman filtering and Fast Fourier Transform (FFT) processing, have been proposed to detect stall precursors by analyzing signals indicative of compressor operating parameters. If a stall precursor is detected, operation of the gas turbine may be controlled to prevent stall from occurring. However, such control techniques typically rely on prediction of an incipient stall condition, and the prediction of the stall condition may not be provided in a sufficiently long period of time before a stall condition to prevent the stall condition from occurring.

BRIEF DESCRIPTION OF THE INVENTION

A method of detecting onset of a gas turbine condition, which if left uncorrected, may result in a malfunction of a gas turbine, is described herein as including receiving data indicative of an operating parameter of a compressor of the gas turbine. The method also includes performing a wavelet transformation on the data to generate wavelet transformed data. The wavelet transformation is configured to affect a processing characteristic regarding a performance of said transformation. The method further includes generating wavelet transformed data, then identifying features of the wavelet transformed data indicative of onset of the gas turbine condition.

A system for detecting onset of an operating condition in a gas turbine is described herein as including a sensor for providing data indicative of an operating parameter of a compressor of the gas turbine and a processor, coupled to the sensor. The processor includes a first processing module configured to perform a wavelet transformation on the data to generate wavelet transformed data, the wavelet transformation being configured to affect a processing characteristic regarding a performance of said transformation. The processor also includes a second processing module for identifying features of the wavelet transformed data indicative of onset of the gas turbine condition.

Figure 1:
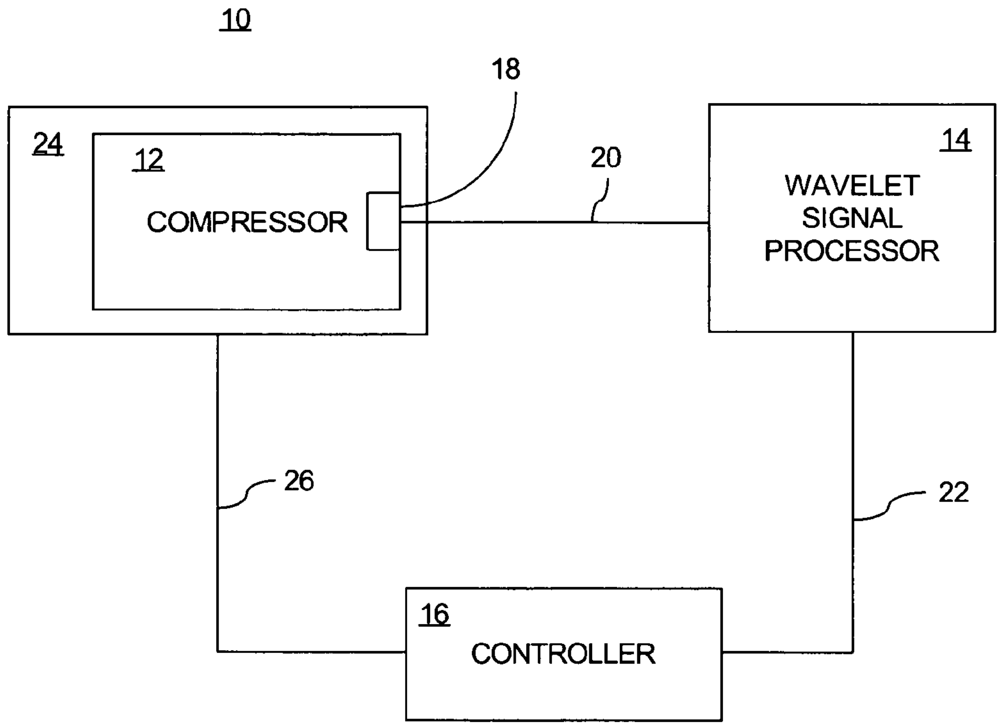
FIG. 1 shows an exemplary block diagram of a gas turbine control system for compressor stall and surge precursor detection embodying aspects of the present invention.

In certain situations, for reasons of computational efficiency or ease of maintenance, the ordering of the blocks of the illustrated flow chart may be rearranged by one skilled in the art. While the present invention will be described with reference to the details of the embodiments of the invention shown in the drawing, these details are not intended to limit the scope of the invention.

DETAILED DESCRIPTION OF THE INVENTION

Wavelet transformations may be used to analyze gas turbine compressor pressure data to detect stall precursors and predict an incipient compressor stall condition. While a relatively simple wavelet transform, such as a Haar transform, may be used to predict stall, the inventors of the present invention have experimentally shown that a Haar transform may result in more “false” stall predictions than a more computationally complex wavelet transform, such as a discrete Meyer (Dmey) transform. However, despite improved stall prediction performance compared to the Haar wavelet transform, the Dmey transform may be unable to predict a stall condition in sufficient time to control the stall condition. Because the Dmey transform is more computationally complex, the Dmey transform may take a longer time to execute than a simpler Haar transform. Consequently, the time required to perform a Dmey transform to detect a stall precursor may exceed a time period between generation of the stall precursor and onset of the stall condition. The inventors have innovatively realized that by optimizing a relatively complex wavelet transform to reduce a computational load for performing the transform, improved compressor stall prediction, such as earlier prediction of stall and reduction of false predictions, may be achieved.

FIG. 1 shows an exemplary block diagram of a gas turbine control system 10 for compressor stall and surge detection embodying aspects of the present invention. Generally, the system 10 includes a compressor 12 operative within a gas turbine 24, a wavelet signal processor 14, and a controller 16. A sensor 18, or group of sensors, may be disposed in the compressor 12 to measure compressor operating parameters such as gas pressure, velocity of gases flowing through the compressor, force, or vibrations. In an aspect of the invention, pressure measurements 20 generated by the sensor 18 may be digitized and provided to the wavelet signal processor 14 in the form of blocks of digital data. Sensor 18, such as a gas pressure transducer, may be positioned in a compressor casing at a desired stage of the compressor 12 to measure pressure oscillation as blades of the compressor 12 pass the sensor 18. The wavelet signal processor 14 may be innovatively configured to perform an optimized wavelet transform on measurement data received from the sensor 18 to identify stall precursors in the data. The wavelet signal processor 14 may also generate a stall measure signal 22 indicative of an incipient stall condition in the compressor 12. The stall measure signal 22 may be provided to the controller 16 to allow the controller to issue appropriate control commands 26 to the gas turbine 24 to prevent an approaching stall or surge condition.

As described above, improved stall prediction may be achieved by using a relatively complex wavelet transform (such as a Dmey transform instead of a simpler Haar transform), but the time required to perform a complex transform may be too long to allow timely control of incipient stall. Accordingly, the inventors have realized that by optimizing a wavelet transformation to reduce the amount of time required to perform the transform and associated signal processing, the earlier prediction advantages provided by relatively complex wavelet transforms may be realized in a shorter time than required using conventional, non-optimized wavelet transform methods. A wavelet transform may be optimized to affect a processing characteristic regarding a performance of the transformation, such as by reducing a processing speed characteristic or reducing a computational complexity characteristic.

Optimization of a wavelet transformation process may include such innovative techniques as "truncating" wavelet coefficients; using selective decomposition/reconstruction at various levels of a wavelet transformation process; serially partitioning, in time, component tasks of a wavelet transformation process; using decomposition coefficients in the wavelet domain (instead of reconstructing the coefficients back into the time domain); sequentially performing wavelet computations on respective data segments of a received block of data; and mixing wavelet processed data with newly received data.

In an embodiment of the invention, the inventors have experimentally demonstrated that by truncating, or eliminating, wavelet transform coefficients having relatively lower absolute values than higher absolute value coefficients, a wavelet transformation process may be accelerated without compromising the ability of the transform to identify stall precursors in the data. By eliminating comparatively lower absolute value coefficients that add little to a wavelet transform's ability to identify precursors, computationally intensive convolution of such coefficients may be eliminated from the optimized wavelet transform process, thereby reducing the computation time required at each level of decomposition and reconstruction. For example, it has been demonstrated by the present inventors that a Dmey wavelet transform performed on a compressor pressure measurement signal may be truncated to use the seven highest absolute value wavelet coefficients from among a generated set of 62 wavelet coefficients. Accordingly, by eliminating the 55 lowest absolute value coefficients, the computational time required to perform such an optimized wavelet transform may be reduced. Such a truncated transform has been shown to retain the capability to detect stall precursors in a timely manner. It will be appreciated that the foregoing number of coefficients merely represent an example and should not be construed as a limitation of the present invention.

In another aspect of the invention, a wavelet transform may be optimized by selecting just one set of coefficients at each level of the wavelet transformation. For example, at each level of decomposition and reconstruction, one set of coefficients, either a set of approximation or low frequency wavelet coefficients or a set of detailed, or high frequency, wavelet coefficients may be selected for further processing.

Figure 2:
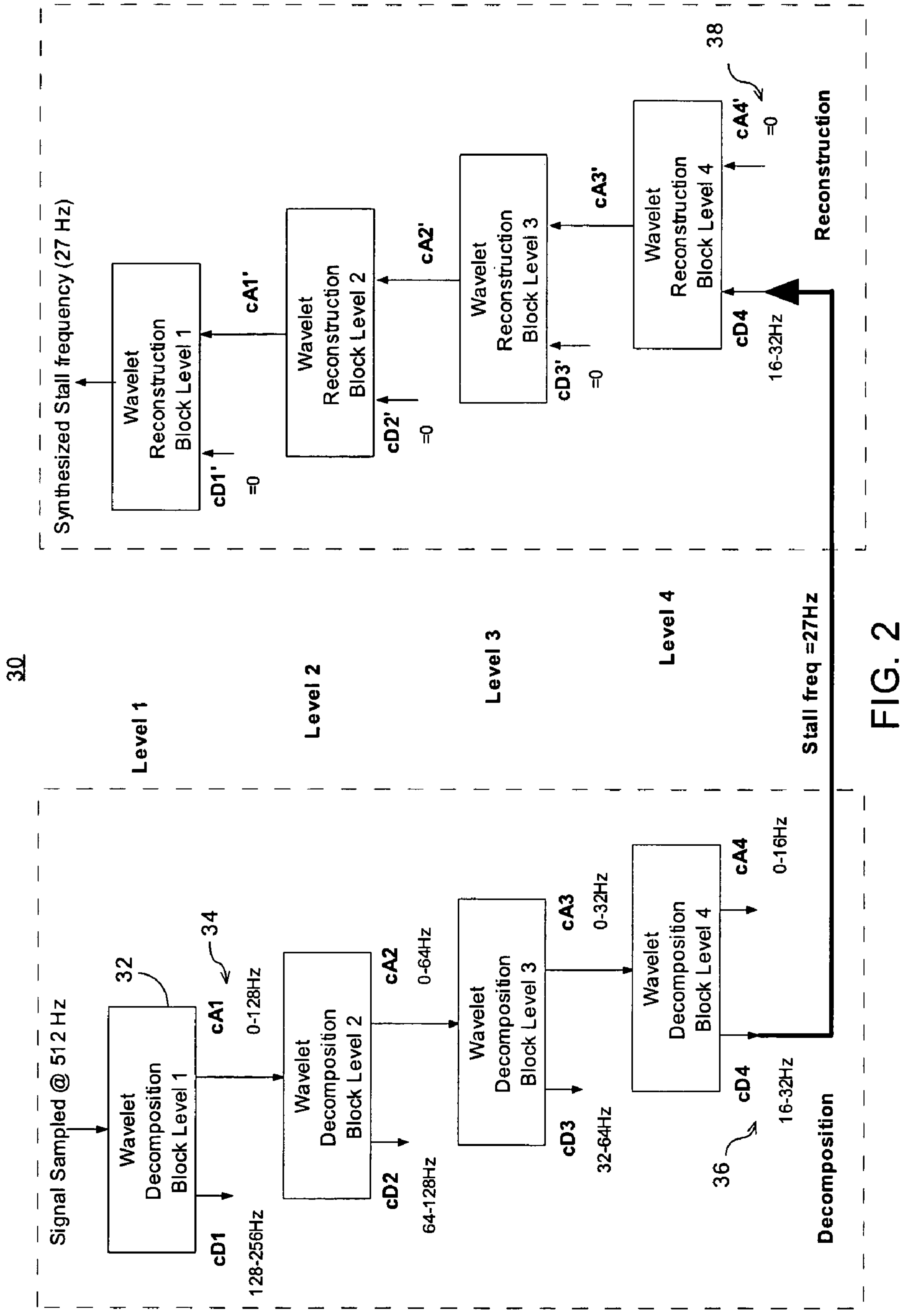
FIG. 2 is a block diagram showing an exemplary optimized wavelet decomposition and reconstruction to identify stall precursors.

FIG. 2 is a block diagram 30 of an exemplary optimized wavelet transformation showing selection of detailed coefficients or approximation coefficients at each level of the decomposition and reconstruction. A compressor pressure measurement signal may be downsampled, for example, at 512 Hertz, and provided as an input to the optimized wavelet transform. At the level one decomposition block 32, the approximation coefficients 34 (representing the lower frequency components) are selected for further processing. At decomposition levels 2 and 3, the approximation coefficients are selected at each level. At level 4, a desired frequency window may be isolated in the detailed coefficients 36. For example, a desired frequency window may be selected around 27 Hertz, a frequency in a pressure signal from a compressor of certain models of gas turbines known to contain precursor information. It will be appreciated that the frequency window may be selected at other frequencies depending on the requirements of any given application. The decomposed waveform may then be reconstructed starting in reconstruction block level 4 by using the detailed coefficients 36 from the decomposition level 4 as an input and filling the approximation reconstruction coefficient 38 with a value of zero. For the rest of the reconstruction levels, from level 3 up to level 1, the approximate reconstruction coefficients are used, and the corresponding detailed reconstruction coefficients are filled with 0's. As a result, computation times to synthesize a stall frequency using the optimized wavelet transform may be reduced by as much as one half compared to a non-optimized wavelet transform that processes both group of coefficients at each level.

In yet another embodiment, a wavelet transformation may be optimized by performing one or more levels of wavelet decomposition, and using the resulting wavelet decomposition information to identify stall precursors. Unlike conventional wavelet signal analysis techniques that include both decomposition and reconstruction of a signal, performing a wavelet decomposition and then using the decomposition information (in the "wavelet domain") for signal analysis may reduce the computational loading compared to a full wavelet transform using both decomposition and reconstruction. For example, as shown in FIG. 2, successive levels of decomposition may be performed until coefficients 36 windowing a desired frequency of interest, such as 27 Hertz, is captured. The wavelet coefficients calculated at a desired decomposition level may then be used to identify precursors at the frequency of interest. By using the decomposition information at a desired decomposition level, such as by performing a moving root mean squared (RMS) calculation in the resulting coefficients, stall precursors may be identified in a computationally efficient manner based on the results of the decomposition.

In another aspect, a wavelet transformation may be optimized by serially performing component tasks of the wavelet transform to spread computation of the wavelet transform out over a time period longer than a time period that would typically be used to perform the transform. For example, component tasks of a wavelet transform, such as convolutions performed at each level of decomposition and reconstruction, are parsed in time to effectively "average" a computational loading. Accordingly, a relatively high computational loading "spike" over a relatively short period of time characteristic of conventional wavelet transforms may be spread out over a relatively longer period of time by parsing component tasks into sequential steps, each step having a relatively lower computational load than the conventional computational loading spike. Using a Dmey wavelet transform, the inventors have experimentally determined that by spreading the wavelet transform task out in time, stall precursors in a pressure measurement signal may be identified without any appreciable loss of stall precursor detection accuracy. For example, by processing individual steps instead of processing all steps in one data gathering cycle, one sixth of the processing capability is used for each step (such as 100 microseconds of processing time) compared to the processing capability required for processing all the steps (such as 600 microseconds of processing time).

In an exemplary embodiment of the invention, spreading the wavelet transform task out in time may include spreading the Wavelet computations over N+M+4 steps, where N is the number of decomposition levels and M is the number of reconstruction levels. For example, a Dmey wavelet transform having four decomposition levels and four reconstruction levels may be used on 1 second's worth of buffered pressure measurement data sampled at 512 Hertz. Four wavelet stall/surge output assessments may be performed on the sampled data per second. Each assessment may include the following steps, wherein each step described below may last 1/512, or 0.002, seconds:

Step 1: Receive one second's worth of buffered data.

Step 2: Perform the wavelet first level decomposition.

Step 3: Perform the wavelet second level decomposition on the first level approximation coefficients.

Step 4: Perform the wavelet third level decomposition on the second level approximation coefficients.

Step 5: Perform the wavelet fourth level decomposition on the third level approximation coefficients and retain the detail coefficients.

Step 6: Perform the wavelet first level reconstruction on the fourth level decomposition detail coefficients, setting the first level reconstruction approximation coefficients to zero.

Step 7: Perform the wavelet second level reconstruction on the first level reconstruction approximation coefficients (from Step 6), setting the second level reconstruction detail coefficients to zero.

Step 8: Perform the wavelet third level reconstruction on the second level reconstruction approximation coefficients, setting the third level reconstruction detail coefficients to zero.

Step 9: Perform the wavelet fourth level reconstruction on the third level reconstruction approximation coefficients, setting the fourth level reconstruction detail coefficients to zero.

Step 10: Compute the root mean square (RMS) of the wavelet fourth level reconstruction approximation coefficients. This value may be called the reconstruction RMS.

Step 11: Compute the average of the current reconstruction RMS and the three previous corresponding reconstruction RMS values in time.

Step 12: Populate a reconstruction RMS buffer so that the fourth element of the buffer is the reconstruction RMS computed three output computation cycles ago, the third element of the buffer is the reconstruction RMS computed two output computation cycles ago, the second element of the buffer is the reconstruction RMS computed one output computation cycles ago, and the first element of the buffer is the current reconstruction RMS. Each element of the reconstruction RMS buffer is initially set to zero.

Steps 1 through 12 may be repeated at every wavelet stall/surge output assessment time. In the case described above, Steps 1-12 are repeated 4 times per second. Note that if no reconstruction steps are performed, i.e., M=0, then Steps 6-9 can be omitted, and the reconstructed RMS in Step 10 is computed from the fourth level decomposition detail coefficients rather than the fourth level reconstruction approximation coefficients.

In yet another embodiment, a wavelet transform for analyzing a block of data may be optimized by partitioning the block of data into respective data segments and sequentially performing a wavelet transformation on each of the respective data segments. Instead of waiting to receive an entire block of data, a wavelet transform may be sequentially performed on smaller segments of the data block, thereby allowing faster computation of the wavelet transform for each segment, and faster outputting of wavelet transformed data than if a wavelet transform is performed on the entire data block. For example, a received data block representing compressor pressure data extracted from a desired compressor stage may be parsed into four segments. Upon receiving a first segment of the data block, a wavelet transform may be performed on the first segment. The wavelet transform information for the first segment may be stored in a buffer, such as a first-in, first-out buffer (FIFO). The buffer may be configured to have a data width corresponding to a wavelet transformed segment size and a data depth of four data segment storage locations.

Upon receiving a next, or second segment, of the block of data, a wavelet transform may be performed on the second segment and stored in the buffer, shifting the previously stored wavelet transformed segment to an adjacent buffer location. This operation may be iteratively performed until reaching the last, or fourth segment. As a result, the buffer comprises wavelet transformed data representing the entire received data block and makes transform data available for a segment as soon as the wavelet transform for the segment is complete. Upon receipt of a new block of data, wavelet transformed data corresponding to a first segment of the new block may flush the wavelet transformed previous first segment from the buffer, for example, according to a FIFO rule. Using the innovative method described above, wavelet transformed data may be provided after processing each segment of the data block instead of waiting to receive the entire data block before performing a wavelet transform. As a result of providing wavelet transformer data quicker, stall precursors may be identified more quickly than is possible using conventional wavelet transform techniques.

In yet another aspect, a wavelet transform process may be optimized by mixing wavelet transformed data with raw data. For example, an earlier received block of data that has been wavelet transformed may be mixed with a later received, untransformed block of data prior to generate mixed data comprising both transformed and raw data. Advantageously, by performing a wavelet transformation on the mixed data, the inventors have experimentally demonstrated that stall precursors may be identified relatively earlier than possible using raw data.

Figure 3:
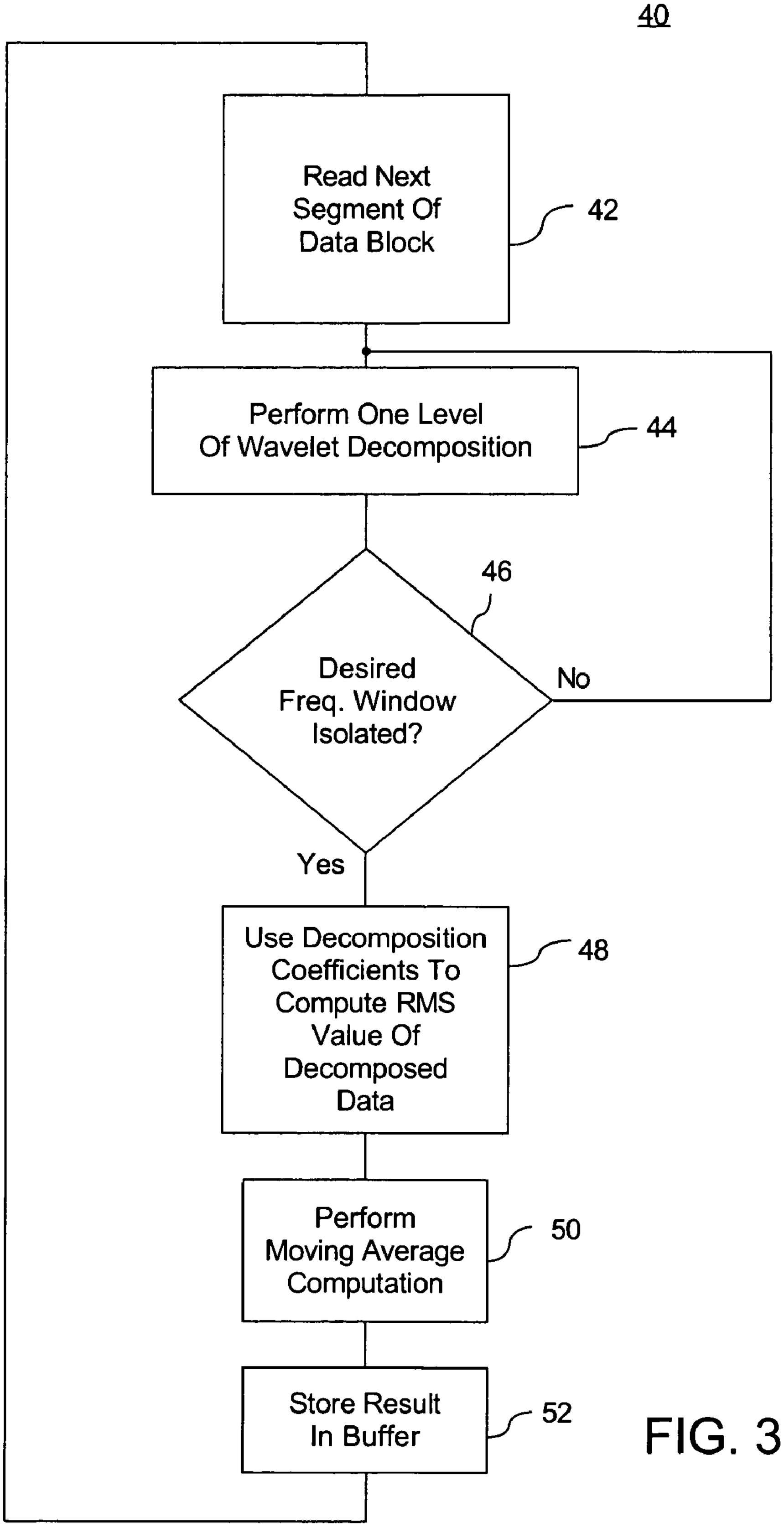
FIG. 3 is a flow chart for an exemplary method of performing an optimized wavelet transform on compressor pressure data for identifying stall precursors.

FIG. 3 is a flow chart 40 for an exemplary method of performing an optimized wavelet transform on compressor pressure data for identifying stall precursors. The method depicted in FIG. 3 may advantageously combine several optimization techniques as described above to improve precursor detection compared to conventional wavelet transform methods. Initially, in block 42, a segment of a data block is read and a first level of wavelet decomposition is performed on the segment in block 44. If a desired frequency window has been isolated at block 46 (for example, in either of the resulting detail or approximate coefficients), the desired coefficients are used to compute a root mean square (RMS) value of the signal corresponding to the decomposed coefficients in block 48. If a desired frequency window has not been isolated at block 46, then another level of wavelet decomposition is performed by returning to block 44. The process depicted in blocks 44 and 46 may be repeated until a desired frequency window has been isolated. After computing the RMS value in block 48, a moving average computation may be performed at block 50, and the results may be stored in a buffer according to block 52. The next data segment of the data block may then be read in step 42, and the process of flow chart 40 repeated for the subsequent segments, until all segments of the data block are processed. The resulting wavelet transformed data may then be analyzed, such as by detecting a threshold crossing of the transformed data to determine the presence of stall precursors. A corresponding stall measure signal may then be generated and provided to a gas turbine controller to modify operation of the gas turbine to prevent stall. The above describe method has been experimentally demonstrated to provide improved recognition of stall precursors.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. For example, the techniques described above may be combined with each other or used singly to optimize a wavelet transform process to provide improved precursor detection. Accordingly, it is intended that the invention be limited only by the spirit and scope of the appended claims.

We claim as our invention:

1. A method of detecting onset of a gas turbine condition, which, if left uncorrected, may result in a malfunction of a gas turbine, said method comprising:

receiving data indicative of an operating parameter of a compressor of the gas turbine;

performing an optimized wavelet transformation on the data, said optimized wavelet transformation configured to affect a processing characteristic regarding a performance of said optimized wavelet transformation;

generating wavelet transformed data based on said optimized wavelet transformation; and identifying features in said wavelet transformed data indicative of onset of the gas turbine condition.

2. The method of claim 1, wherein said processing characteristic is selected from the group consisting of processing speed and computational complexity.

3. The method of claim 1, wherein said optimized wavelet transformation comprises truncating at least some of a set of wavelet coefficients generated by said wavelet transformation.

4. The method of claim 3, wherein said truncating comprises eliminating coefficients having a relatively smaller absolute value compared to coefficients having a relatively larger absolute value.

5. The method of claim 1, wherein said wavelet transformed data is selected from the group consisting of wavelet decomposition data and wavelet reconstruction data.

6. The method of claim 5, wherein said wavelet transformation comprises performing at least one level of decomposition to create wavelet decomposition data; said at least one level of decomposition being performed without reconstructing said wavelet decomposition data.

7. The method of claim 1, wherein said wavelet transformation comprises serially performing component tasks of said wavelet transformation to spread said wavelet transformation out over a time period longer than a time period required to perform said component tasks in parallel.

8. The method of claim 1, wherein said wavelet transformation comprises using only one of the group consisting of wavelet approximation coefficients and wavelet detailed coefficients at each level of said wavelet transformation.

9. The method of claim 1, wherein performing said wavelet transformation on the data further comprises:

partitioning the data into respective data segments; and sequentially performing said wavelet transformation on said respective data segments.

10. The method of claim 1, further comprising:

receiving additional data indicative of the operating parameter of the compressor of the gas turbine;

mixing said wavelet transformed data with the additional data to create mixed data; and performing said optimized wavelet transformation on said mixed data to generate secondary wavelet transformed data based on said mixed data.

11. The method of claim 1, wherein said optimized wavelet transformation utilizes a Dmey transform for transformation of the data.

* * * * *